United States Patent [19]

Kudo et al.

[11] Patent Number: 4,727,953
[45] Date of Patent: Mar. 1, 1988

[54] BODY FRAMES FOR AUTOMATIC TWO-WHEELED VEHICLES

[75] Inventors: Takashi Kudo, Shiki; Shigeki Mizumachi, Fujimi; Shusaku Noguchi, Tokorozawa; Hiroo Takemura, Asaka; Tatsuo Kurosawa, Kawagoe, all of Japan

[73] Assignee: Honda Giken Kogyo Kabushiki Kaisha, Tokyo, Japan

[21] Appl. No.: 56,293

[22] Filed: May 29, 1987

Related U.S. Application Data

[63] Continuation of Ser. No. 804,957, Dec. 2, 1985, abandoned.

[30] Foreign Application Priority Data

| Dec. 5, 1984 | [JP] | Japan | 59-183638[U] |
| Feb. 28, 1985 | [JP] | Japan | 60-27239[U] |
| Mar. 5, 1985 | [JP] | Japan | 60-43370 |
| Mar. 5, 1985 | [JP] | Japan | 60-43371 |
| Mar. 5, 1985 | [JP] | Japan | 60-43372 |
| Mar. 6, 1985 | [JP] | Japan | 60-44251 |
| Mar. 6, 1985 | [JP] | Japan | 60-44253 |

[51] Int. Cl.$^4$ .......................... B62K 11/02
[52] U.S. Cl. .................. 180/219; 280/281 R
[58] Field of Search .......... 180/219, 311, 312; 280/281 R, 274, 781

[56] References Cited

U.S. PATENT DOCUMENTS

| 2,537,325 | 1/1951 | Bowden | 280/281 R |
| 2,792,899 | 5/1957 | Piatti | 280/281 R X |
| 4,280,582 | 7/1981 | Kouyama et al. | 280/281 R X |
| 4,323,135 | 4/1982 | Tominaga et al. | 280/281 R X |
| 4,556,119 | 12/1985 | Shiratsuchi | 180/219 |
| 4,585,086 | 4/1986 | Hiramatsu | 180/219 |
| 4,585,246 | 4/1986 | Diekman et al. | 280/281 R |

FOREIGN PATENT DOCUMENTS

| 399275 | 6/1923 | Fed. Rep. of Germany | 280/281 R |
| 1015718 | 10/1952 | France | 180/219 |
| 18539 | 10/1895 | United Kingdom | 280/281 R |
| 1281731 | 7/1972 | United Kingdom | 280/281 R |

*Primary Examiner*—John J. Love
*Assistant Examiner*—Charles R. Watts
*Attorney, Agent, or Firm*—Armstrong, Nikaido, Marmelstein & Kubovcik

[57] ABSTRACT

A pair of main frames, which form an essential part of a body frame of a motorcycle, are fixed at the front ends to a head pipe, and extend toward the rear portion of a body at a given increasing interval. Each of the main frames includes therein a partition extending in the longitudinal direction.

18 Claims, 28 Drawing Figures

BODY FRAMES FOR AUTOMATIC TWO-WHEELED VEHICLES

This is a continuation of application Ser. No. 804,957, filed Dec. 2, 1985 and now abandoned.

FIELD OF THE INVENTION AND RELATED ART STATEMENT

The present invention relates to a body frame for automatic two-wheeled vehicles or motorcycles.

The prior art body frames for motorcycles are of several types, the first type is a backbone type wherein a single main frame is fixed at the front end to a head pipe for supporting a front wheel steering mechanism, and extends downwardly toward the rear portion of the body. The second type is a cradle or double-cradle type wherein a pair of main frames are fixed at the front ends to the head pipe, and extend downwardly at a given increasing interval toward the rear portion of the body.

The body frame for motorcycles should be tough enough to support the weight of various parts such as an engine or a rider. It should stand also up to vibrations that occur while the motor-cycle is running. However, the body frame should be somewhat flexible to absorb the vibration of the associated engine or the vibration of the body that occurs while the motorcycle is running. In addition, further consideration should be given to a space in which various parts such as an engine are mounted.

Hence, in the backbone, or cradle or double-cradle type frames and the like, the body frames are constructed from a number of reinforcing frames such as down tubes, side frames, cross members, etc. assembled to the main frames. The reinforcing frames are formed of a relatively thin pipe.

For that reason, it is difficult to decrease the weight of the body frame. In addition, certain limitations are placed upon the space for attachment of a various parts.

OBJECT AND SUMMARY OF THE INVENTION

The present invention has been accomplished with consideration of the aforesaid standpoints. The present invention has as one object to reduce the weight of a body frame and to reasonably improve the attachment of various associated parts to the frame by giving enough strength to the main frame forming part of the body frame for the motorcycle and thereby omitting any reinforcing frame.

According to the present invention, the object of the present invention is achieved by the provision of a body frame for a motorcycle, which includes a pair of main frames fixed at the front ends to a head pipe for a front wheel-steering mechanism. The main frames extending downward at a given increasing interval toward the rear portion of a body. Each of the main frames includes a longitudinally extending partition.

BRIEF DESCRIPTION OF THE DRAWINGS

FIG. 1 is a side view of a motorcycle;
FIG. 2 is a side view of the body frame;
FIG. 3 is a plan view of the frame
FIG. 4 is a sectional view of the main frame;
FIG. 5 is a side view of the swing arm for supporting the rear wheel;
FIG. 6 is a plan view of that arm.

FIG. 7 is a side view of the front portion of a motorcycle in a state where it is elevated by a supporting stand for servicing;
FIG. 8 is a plan view of the body frame;
FIG. 9 is a side view of part of the front portion of the motorcycle;
FIG. 10 is a sectional view of the main frames; and
FIG. 11 is a sectional view of the portion of the main frames to which a tubular member is attached;

FIG. 12 is a side view of a motorcycle;
FIG. 13 is a perspective view of the body frame;
FIG. 14 is a side view of the main frames;
FIG. 15 is a sectional view illustrating the portion on which the engine hanger is mounted;
FIG. 16 is a side view showing part of another embodiment of the portion on which the engine hanger is mounted;
FIG. 17 is a sectional view of FIG. 16;
FIG. 18 is a sectioned plan view of the cable passage in the head pipe gusset;
and
FIG. 19 is a sectioned plan view of another embodiment of the cable passage.

FIG. 20 is a side view of a motorcycle; and
FIGS. 21 and 22 are a sectional view of part of the main frames.

FIG. 23 is a side view of a motorcycle;
FIG. 24 is a plan view of that motorcycle;
FIG. 25 is a sectional view part of the main frames;
FIG. 26 is a side view of another embodiement of the motorcycle;
FIG. 27 is a plan view of the fifth embodiment; and
FIG. 28 is a sectional view of part of the main frames.

DETAILED DESCRIPTION OF THE PREFERRED EMBODIMENTS

The present invention will now be explained with reference to the accompanying drawings.

FIGS. 1 to 6 show one embodiment of the present invention.

Figure 1:
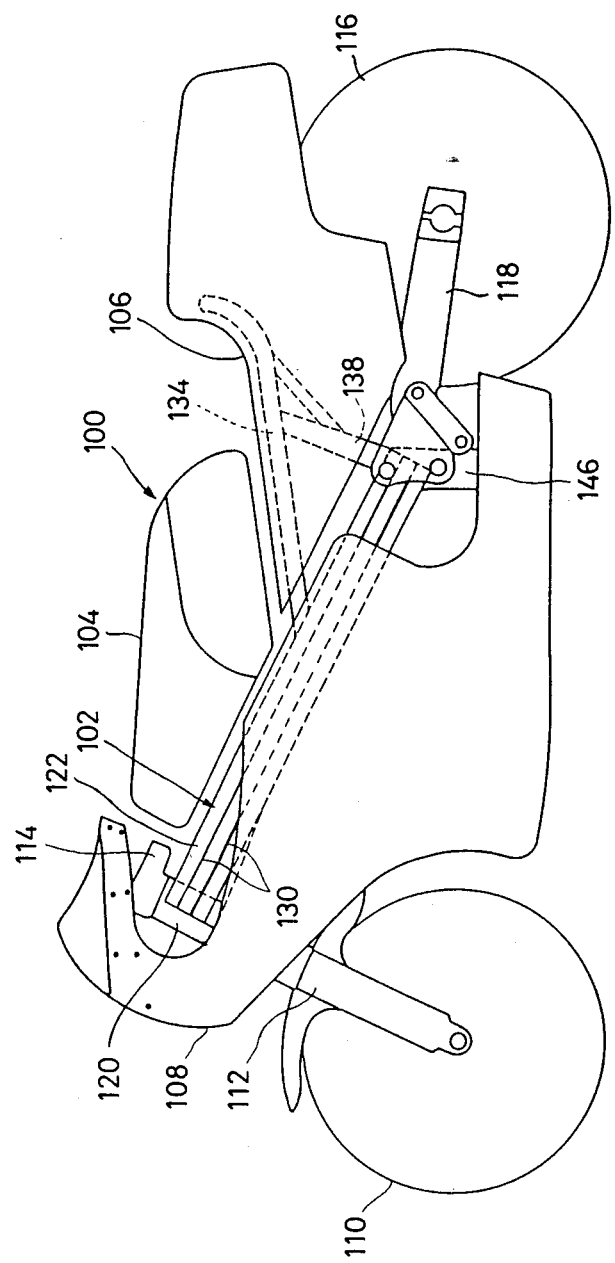
FIGS. 1 to 6 show one embodiment of the present invention.

FIG. 1 is a side view of an automatic two-wheeled vehicle or motorcycle which the present invention is applied. Reference numeral 100 refers to a body, 102 a body frame, 104 a fuel tank, 106 a seat, 108 a cowling, 110 a front wheel rotatably supported on the lower portion of a front fork 112, 114 a handle bar fixed to the upper portion of the front fork 112, and 116 refers to a rear wheel rotatably supported on a rear fork 118.

Figure 2:
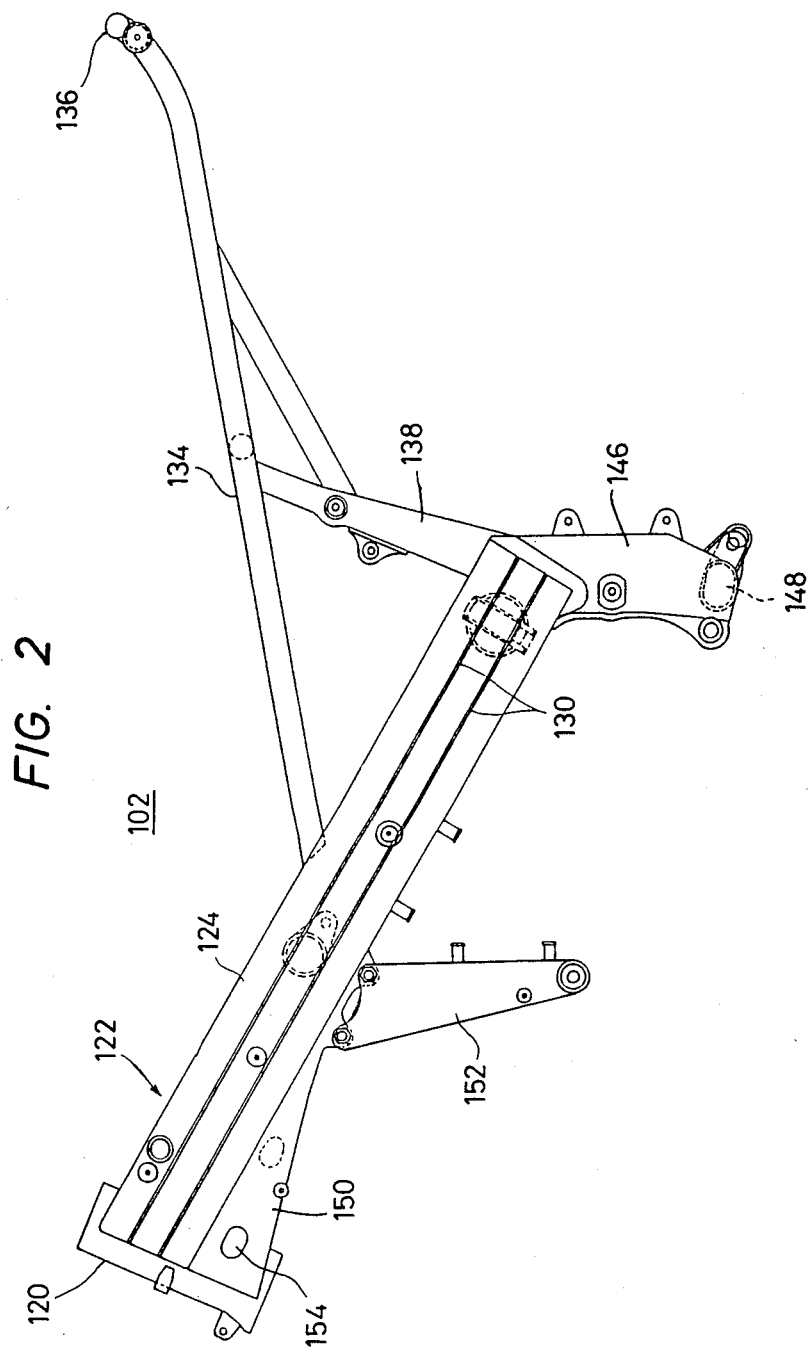
Figure 3:
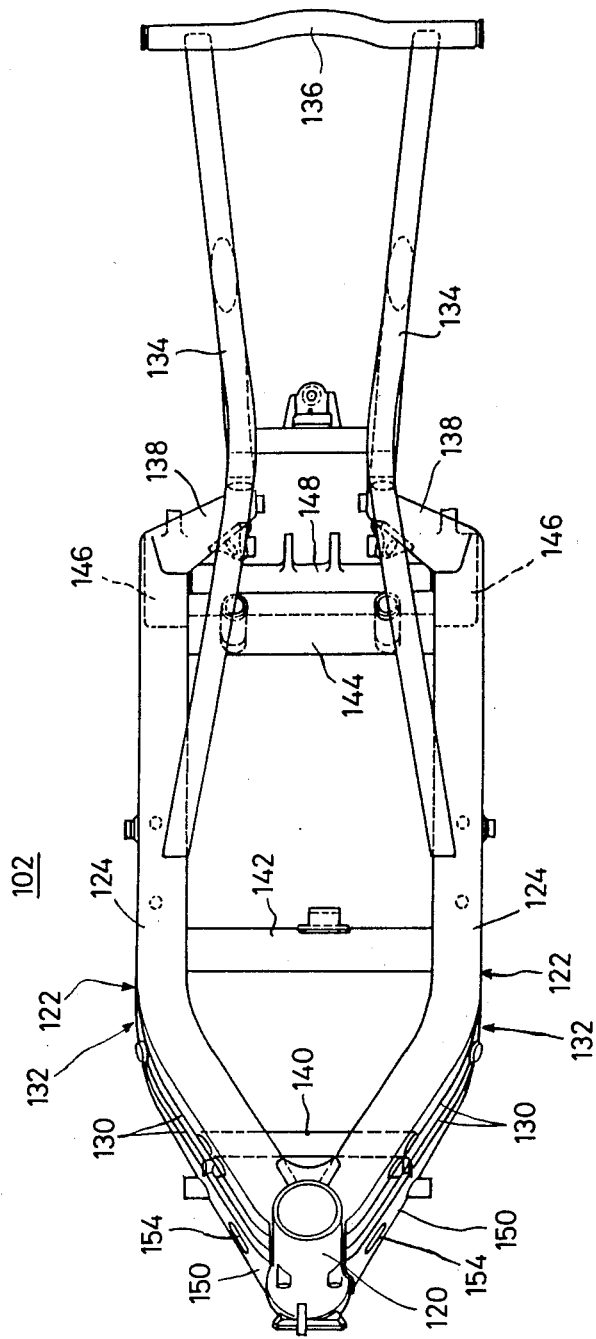

As shown in FIGS. 2 and 3, the body frame 102 includes a pair of main frame 122, 122 welded or otherwise fixed at the front ends of the pair of main frames to a head pipe 120 for rotatably supporting the front fork 112. The front fork 112, head pipe 120, the front wheel 110 and the handlebar 114 define a front wheel-steering system. As shown in FIGS. 1 and 2, the main frames 122, 122 extend downwardly toward the rear portion of the body at a given increasing interval or increasing angle such that they pass by the upper portion of an engine, as shown in FIG. 3.

Figure 4:
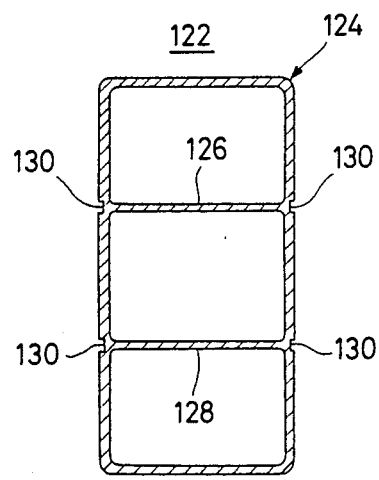

As shown in FIG. 4, each main frame 122 is formed of a closed hollow-type of a metal frame member 124 having a cross sectional rectangular shape. The frame member 124 is vertically divided into three portions by means of two partitions 126 and 128 arranged along the full longitudinal length. The frame member 24 is provided with two elongated grooves 130, 130. The grooves extend along the full longitudinal length of the member 124. The grooves 130, 130 may be formed on one side wall of the frame member 124, which is an outer surface at the time the frame 122 is bent.

Thus, when a portion of each main frame 122 is bent, indicated by an arrow 132, any deformation of the outer wall surface caused by the bending is avoided due to the grooves 130 on the associated frame member 124. To be specific, when the frame 122 is bent, as indicated by an arrow 132, stress generated by the bending of the inner wall portion of the frame member 124 is transmitted to the outer wall portion through the partitions 126, 128. However, since that stress is absorbed in the grooves 130, the outer wall has little or no noticeable deformation and no damage occurs on the main frame. Each frame members 124 may be constructed from a lightweight material such as an aluminum alloy.

In FIGS. 1 through 3, reference numerals 134 and 134 represent a pair of seat rails each formed of a round pipe fixedly welded at one end to a substantially intermediate portion of each main frame 122, as viewed from the longitudinal direction. The other rear end of the seat rails are at a height somewhat higher than the end welded to the main frame 122. The seat rails are connected at the rear ends to each other by a connecting frame 136. Each seat rail is supported at an intermediate portion on the rear end of the main frame 122 by means of a seat rail gusset 138. Referring to FIG. 3 cross members 140, 142 and 144 are interposed between the pair of main frames 122 and 122 at the front ends, intermediate portions and rear ends respectively. Throughout FIGS. 1 to 3, reference numerals 146, 146 represent downwardly extending pivot plates mounted at the rear ends of both main frames 122, 122. The pivot plates 146, 146 are connected at the lower ends to each other by a cross member 148, as shown in FIG. 3.

In FIGS. 2 and 3, reference numeral 150 denotes a reinforcing head pipe gusset welded to the head pipe 120 and the lower portion of each main frame 122. The reinforcing head pipe gusset 150 is mounted at its rear end portion with an engine hanger 152 extending downwardly, as illustrated. An engine, not shown, is mounted on the engine hanger 152 and the pivot plates 146. Reference numeral 154 denotes openings formed through the body frame for passing cables such as a control cable and a wire harness therethrough.

Figure 5:
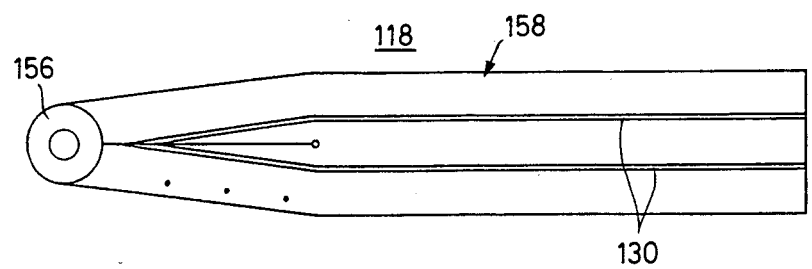
Figure 6:
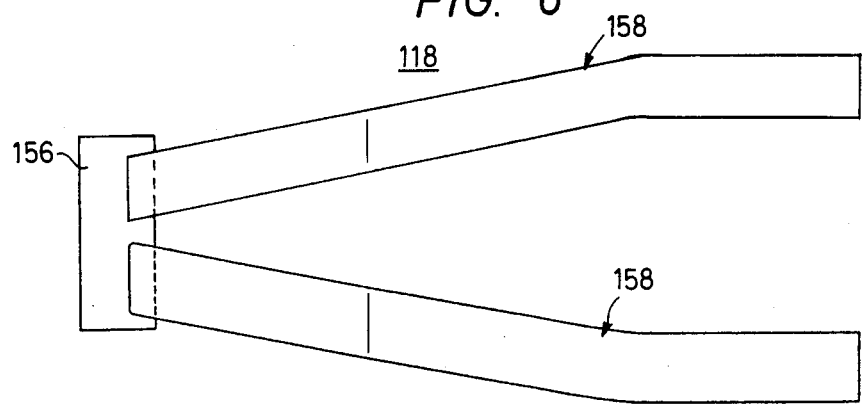

FIGS. 5 and 6 show a rear fork generally shown at 118. The rear fork 118 comprises a pair of rearwardly extending fork frames 158 welded at the front ends to a pivot axis 156 rotatably supported on a pivot plate 146. Each fork frame 158 may also be formed of a frame member 124 provided with grooves 130, as illustrated in FIG. 4.

As explained in detail above, the grooves are formed in the vicinity of the partitions on the portions of the main frame member which define an outer wall surface at the time of bending. Thus, it is possible to prevent any abnormal deformation of the main frames when the frames are bent without fear of damaging the appearance. This is in spite of the fact that the partitions are provided to divide the interior of the frame members into the given parts. The frame members are each formed of a closed hollow type of member of a rectangular shaped cross-section.

Figure 7:
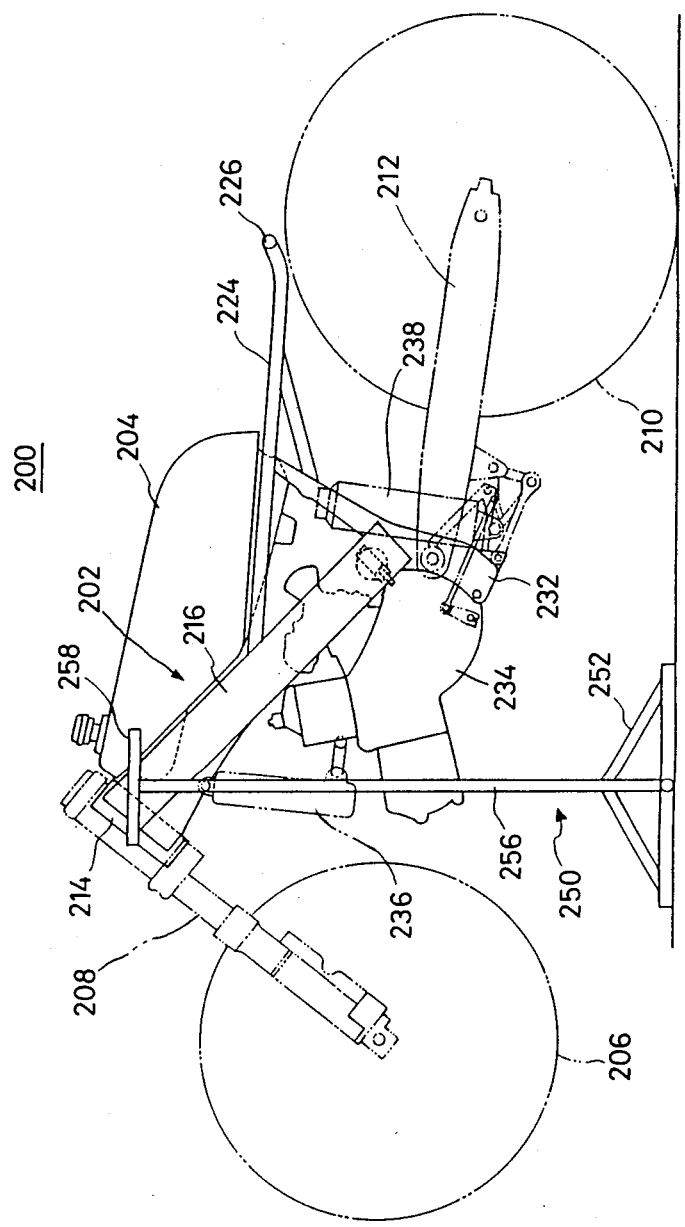
FIGS. 7 to 11 show another embodiment of the present invention.

FIG. 7 to 11 inclusive show another embodiment of the present invention. FIG. 7 shows a motorcycle which is supported at the front portion of the body in an elevated state by means of a support stand. A motorcycle 200 includes a body frame 202, a fuel tank 204, a front wheel 206 rotatably supported on the lower portion of a front fork 208, and a rear wheel 210 rotatably supported on a rear fork 211.

Figure 8:
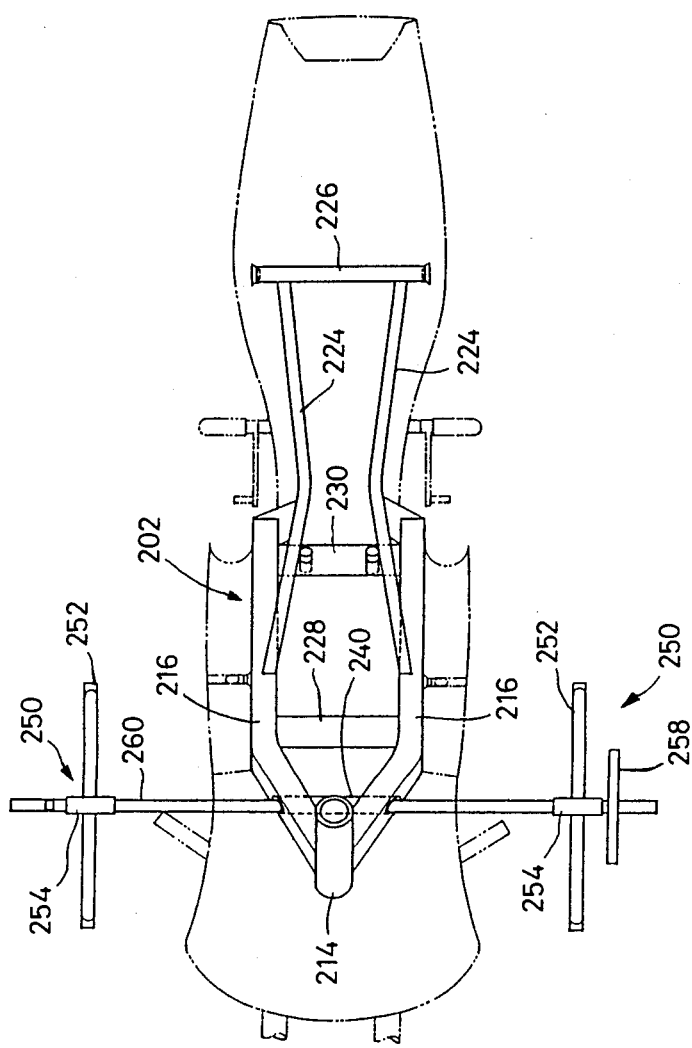
Figure 9:
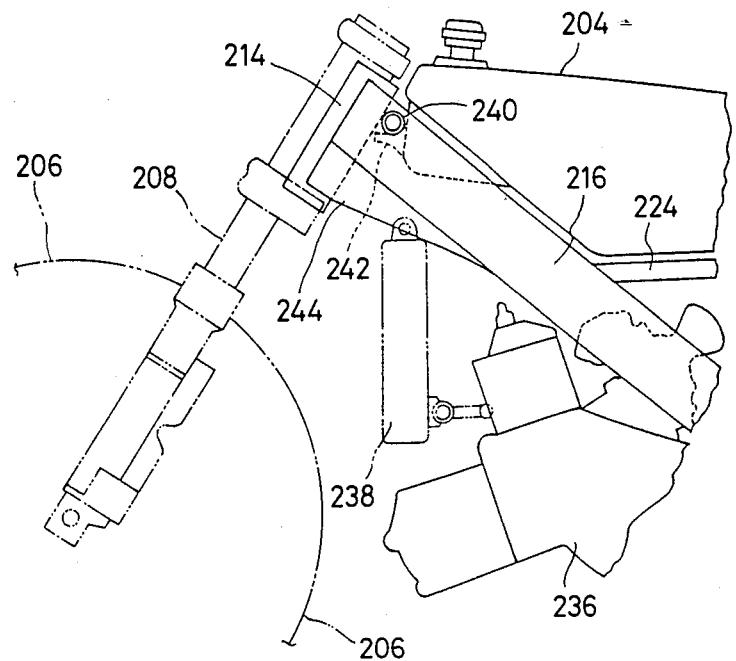

As shown in FIGS. 7 to 9, the body frame 202 includes a pair of main frames 216 and 216 welded or otherwise fixed at the front ends to a head pipe 214. The main frames 216, 216 extend downwardly at a given increasing interval or increasing angle toward the rear portion of the body.

Figure 10:
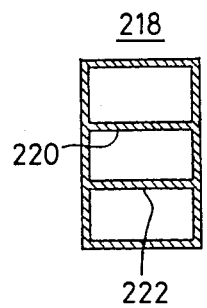

As shown in FIG. 10, each main frame 216 is formed of a closed hollow-type of metal frame member 218 of a cross sectional rectangular shape. The frame member 218 is integrally provided therein with partitions 220 and 222 along the full longitudinal length thereof. The partitions are designed to divide the interior of member 218 into three portions. When the frame member 218 is used as the main frame 216 where its vertical length is larger than its horizontal length, as illustrated in FIG. 10, the rigidity of the main frame 216 is further increased, resulting in a further increase in the strength thereof.

A pair of seat rails 224 and 224 extend rearwardly from substantially intermediate portions of the main frames 216 and 216, as viewed from the lengthwise direction. The seat rails are connected at its rear ends to each other by means of a connecting frame 226. Cross members 228 and 230 are interposed between the intermediate portions and the end portions of the main frames 216 and 216. The pair of main frames 216 are respectively provided with rearwardly extending pivot plates 232, between which the rear fork 212 is swingingly supported. An engine 234 is then supported on the lower portions of the main frames 216, 216 and the front portions of the pivot plates 232, 232. A radiator 236 and a rear suspension 238 are also provided.

Figure 11:
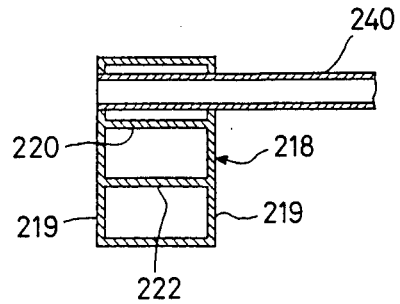

The front end portions of the main frames 216 and 216 are connected to each other by means of a tubular member 240, as illustrated in FIGS. 8 and 9. As shown in FIG. 11, the tubular member 240 passes through the side walls 219, 219 of the frame members 218, 218, and are mounted at both ends thereon. As shown in FIG. 9, the tubular member 240 is engaged from below, at an intermediate portion with a locking piece 242 extending from the front end of the fuel tank 204 so as to restrict any upward movement of that tank.

In FIG. 9, reference numeral 244 denotes a reinforcing head pipe gusset welded to the head pipe 214 and the lower portion of a main pipe 216.

A support stand 250 for elevating and supporting the front portion of the motorcycle 200 in place is illustrated in FIGS. 7 and 8. The stand comprises a pair of supports 256 each including a pair of legs 252 at the lower end and a horizontal pipe 254 at the upper end. A horizontal rod 260 is designed to be detachably inserted through the horizontal pipes 254 and including a grip rod 258 at one end.

In order to service the motorcycle 200 with the use of the support stand 250, the front portion of the motorcycle is manually elevated to insert the horizontal rod 260 into the horizontal pipe 254 of one support 250. The horizontal rod 260 is then handled by the grip rod 258 to insert it into the tubular member 240 from the side of the motorcycle 200. The leading end of the horizontal rod 260 is inserted into the horizontal pipe 254 of the other support 256. As illustrated in FIG. 7, the motorcycle 200 is thus supported by the support stand 250 with the front portion being elevated, thus allowing attachment and detachment of the front wheel 206 and allowing servicing of the engine 234 with high efficiency.

In this embodiment, the vertical length of each frame member 218 used as each main frame 216 is made sufficiently larger than the horizontal length. Is is thus possible to join the main frames 216 and 216 together through the body frame 202 by inserting the tubular member 240 as the strengthening member. Hence, it is not necessary to separately add the supporting pieces to the main frames for engagement with the prior art stand. This results in a reduction in the weight of the motorcycle body, a decrease in the number of the steps applied and improvements in the degree of freedom to attach electrical parts and engine accessories. In addition, since the load of the body acts upon the main frames 216 through the wall of the tubular member 240, the strength and rigidity of the member 240 may be determined only in view of the fact that it is applied as the strengthening member for the body frame 202. It is thus not necessary to give any thickness larger than needed to that wall.

There are also improvements in the degree of freedom in the design of the motorcycle body and its appearance, since the interior of each main frame 216 is formed of a columnar member having a larger vertical length and a cross section of a rectangular shape. Thus, the main frame can be used as a space for accommodating an oil tank and wires.

FIGS. 12 to 19 inclusive show a third embodiment of the present invention.

Figure 12:
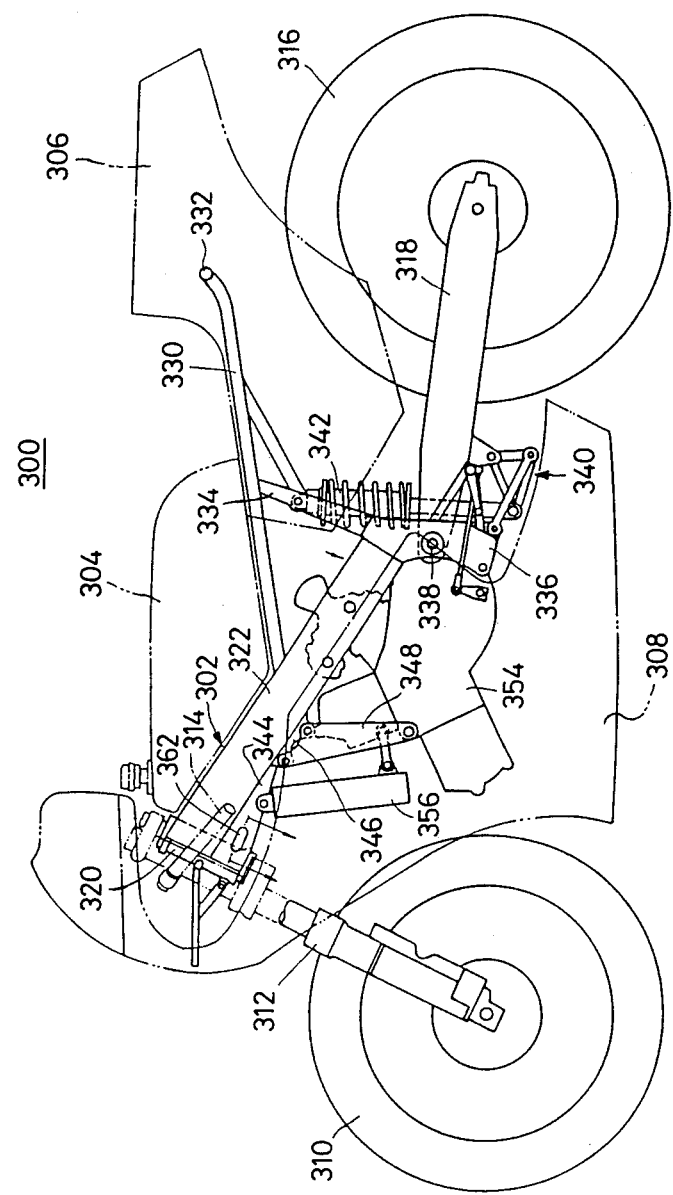
FIGS. 12 to 19 show a third embodiment of the present invention.

FIG. 12 is a side view of a motorcycle including a motorcycle body 300 and a body frame 302, a fuel tank 304, a seat 306, a cowling 308, a front wheel 310 rotatably supported on the lower portion of a front fork 312, a handlebar 314 fixed to the upper portion of the front fork 312 and a rear wheel 316 rotatably supported on an rear fork 318.

Figure 13:
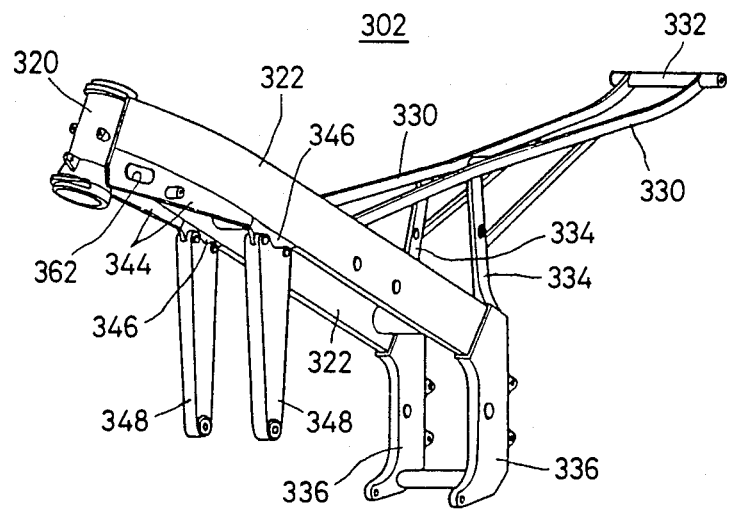

As shown in FIGS. 12 and 13, the body frame 302 includes a pair of main frames 322, 322 having its front ends fixedly welded to a head pipe 320. As illustrated, the pair of main frames 322 and 322 extend linearly downwardly and, as best shown in FIG. 13, extend at a given increasing interval or increasing angle toward the rear portion of the body.

Figure 14:
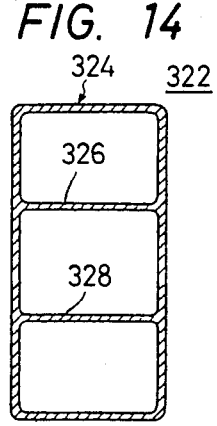

As illustrated in FIG. 14, each main frame 322 is formed of a closed hollow-type of metal frame member 324 of a rectangular shaped cross section. The frame member 324 is integrally provided with partitions 326 and 328 along the full longitudinal length. The partitions are designed to divide the interior of the member 324 into three portions. A pair of seat rails 330 and 330 extend rearwardly from substantially intermediate portions of the main frames 322 and 322, as viewed from the lengthwise direction. The rear ends of the seat rails are connected to each other by means of a connecting frame 332. The pair of seat rails 330 and 330 are supported on the rear ends of the main frames 322 and 322 with seat rail gussets 334 and 334.

Downwardly extending pivot plates 336 and 336 are formed at the rear ends of the main frames 322 and 322. A pivot 338 axis is provided between the pivot plates 336 and 336 for supporting the rear fork 318 which holds the rear wheel 316. The pivot axis allows the rear wheel to have vertical swing movement. A linkage 340 is provided between the pivot plates 336, 336 and the rear fork 318. A rear suspension 342 is also provided.

Reinforcing head pipe gussets 344 and 344 are welded to the head pipe 320 and the lower faces of the main frames 322 and 322.

As shown in FIGS. 12 and 13, engine hanger fittings 346 and 346 are welded or otherwise fixed to the lower portions of the main frames 322 and 322 at the rear ends of the head pipe gussets 344 and 344. The engine hanger fittings 346 and 346 are also welded to the rear end of the head pipe gussets 344 and 344 for integral coupling.

Figure 15:
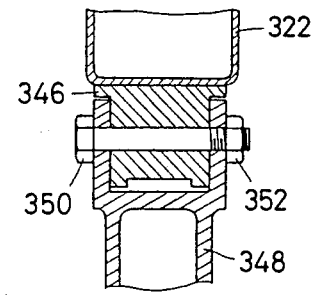

As best shown in FIG. 15, engine hangers 348 and 348 are fixed at the upper ends to the engine hanger fittings 346 and 346 by means of bolts 350 and nuts 352. The hangers extend downwardly. An engine 354 is supported in place with the engine hangers 348, 348 and the pivot plates 336, 336. Reference numeral 356 denotes a radiator.

Figure 16:
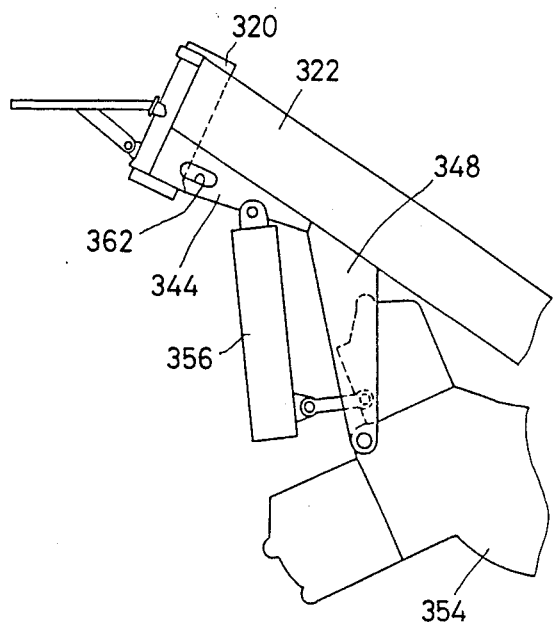
Figure 17:
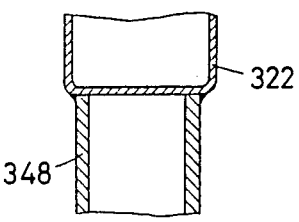

Each engine hanger 348 may be welded directly to the lower surface of the associated main frame 322, as illustrated in FIGS. 16 and 17.

Since the engine hangers 348 and 348 of the main frame 322 and 322 are designed to extend downwardly, it is possible to support a variety of engines in place by varying the shape and form of the engine hangers. It is also possible to support the engine more firmly, since the head pipe gussets 344, 344 are integrally coupled to the engine hanger fittings 346, 346 or the engine hangers 348, 348.

Figure 18:
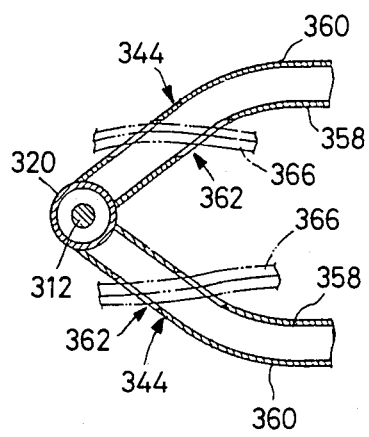
Figure 19:
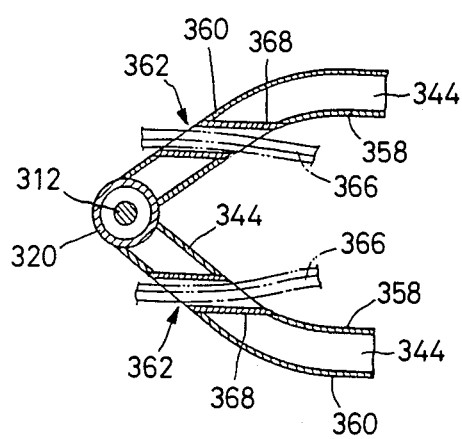

As shown in FIG. 18 or 19, each head pipe gusset 344 is defined by an inner wall 358 and an outer wall 360. The inner and outer walls are provided with openings 362 and 362 which form a cable passage. The openings 362 may be in a lateral oval form, to avoid any increase in the size of each head pipe gusset 344 and to allow movement of a plurality of cables 364 passing through the openings so as to pass the cables at a minimum opening area. Operating lever-control cables are connected to a handlebar 312, a dashboard, etc. Cables 366 such as a wire harness for various lamps and switches are passed through the cable passage (defined by the openings 362) into the associated main frame 322 for wiring at the rear portion of the body.

As illustrated in FIG. 19, the cable passage may be formed by fixedly passing a thin guide pipe 368 in between the inner and outer walls 358 and 360. The guide pipe 368 facilities insertion of the cables 366 and prevents entrance of rainwater into the head pipe gusset 344.

The openings 362 may be not only be in the form of an oval but also in other desired forms including a round form. Depending upon the number of cables to be passed, the openings may be increased in size or may be formed in one of the head pipe gussets 344.

When the cable passages are formed through the body, wiring can be carried out at a reduced distance with no need of arranging cables around the body, unlike the prior art. In addition, bulging and twisting or bending or wirings occurring in the vicinity of the head pipe at the time of steering of the handlebar are absorbed.

Figure 20:
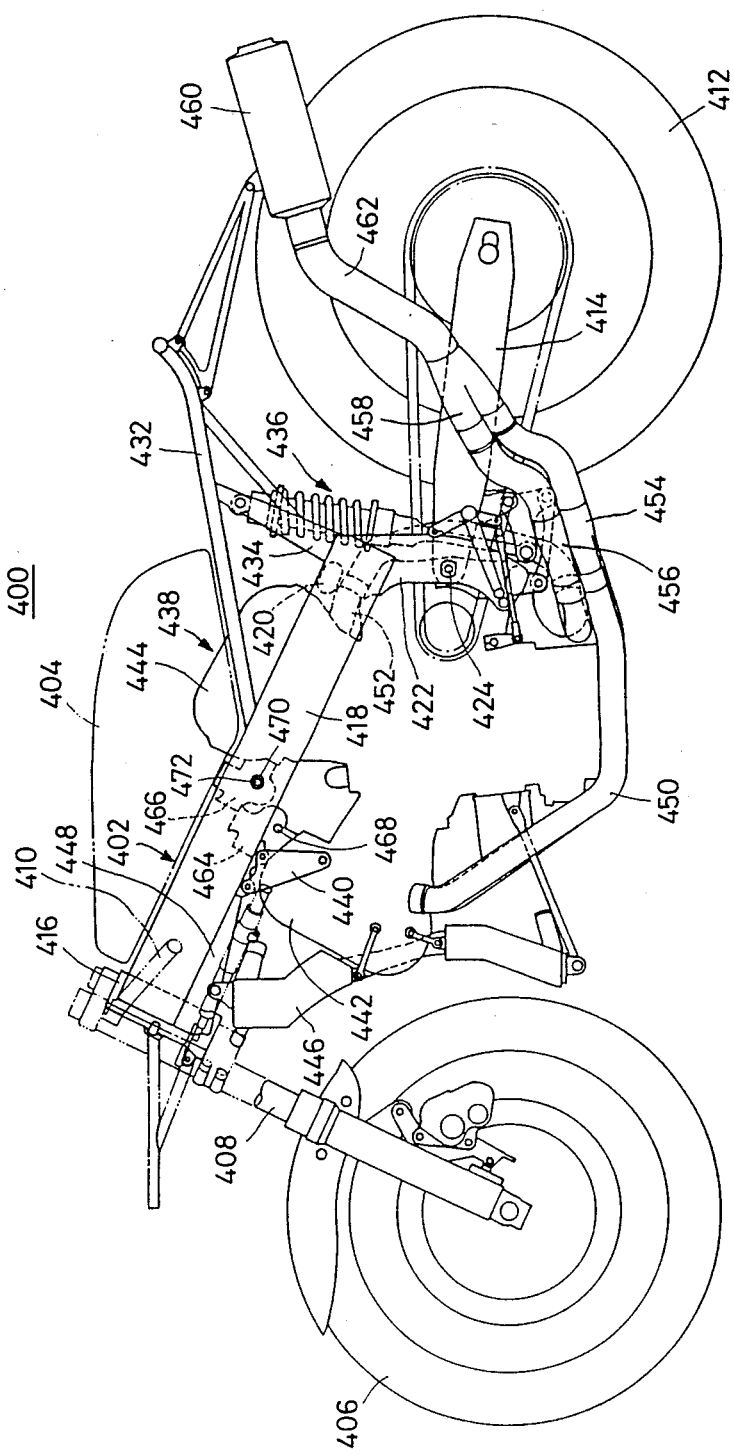
FIGS. 20 to 22 show a fourth embodiment of the present invention.
Figure 22:
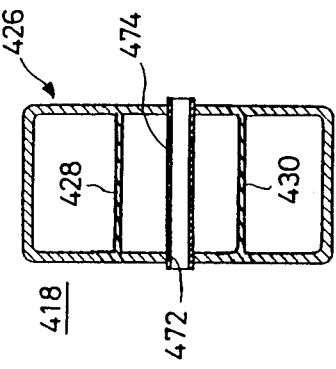
Figure 21:
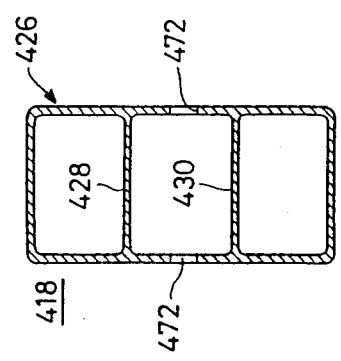

FIGS. 20 to 22 inclusive show a fourth embodiment of the present invention.

FIG. 20 is a side view of a motorcycle including a body generally shown at 400 and comprising a body frame 402, a fuel tank 404, a front wheel rotatably supported on the lower portion of a front fork 406, a handlebar 410, and a rear wheel rotatably supported on a rear fork 414.

The body frame 402 includes the front ends of a pair of main frames 418 welded or otherwise fixed to a head pipe 416. The pair of main frames 418 extend linearly downwardly and pass by the sides of the upper portion of an engine at a symmetrically increasing interval toward the rear portion of the body defining a space having a width sufficient to accommodate the engine. The main frames 418 are connected at the rear ends predeterminedly spaced away from each other by means of a cross member 420. The rear ends of the main frames are provided with pivot plates 422. The rear fork 414, on which the rear wheel 412 is rotatably supported, is supported on a pivot axis 424 held between the pivot plates 422.

As illustrated in FIGS. 21 and 22, each main frame 418 is formed of a closed hollow type of metal (e.g., an aluminum alloy) frame member 426 of a cross sectional rectangular shape. The frame member 426 is integrally provided with partitions 428 and 430 along the full longitudinal length. The partitions are designed to divide the interior of the member into three portions.

A pair of upwardly extending seat rails 432 are mounted on the upper faces of both main frames 418. The seat rails are located substantially at the center of the body, and the intermediate portions of the seat rail are supported by seat gusset plates 434 located above the pivot plates 422. The rear fork 414 is suspended in place by a rear suspension 436 for buffeting.

One portion of a vertical V-type four-cylinder engine 438, located on the front side of the body, is held through a pair of engine hangers 440 extending from the pair of main frames 418. Another portion of the engine is held through the pair of pivot plates 422. A front cylinder portion 442, including the front two cylinders of the engine, overhangs at the upper portion toward the front wheel 406. A rear cylinder portion 444, including the rear two cylinders, projects upwardly from between both main frames 418.

In front of the engine 438, a radiator 446 is suspended at the upper portion from the head pipe gusset 448 welded to the lower faces of the head pipe gusset 416 and the main pipe 418. The radiator is supported at the intermediate and lower portions on the engine 438 through linkage rods.

The front cylinder portion 442 of the engine 438 is provided on the front side of the body with discharge ports for the respective front cylinders, to which two exhaust pipes 450 for the front cylinders are connected. The rear cylinder portion 444 is provided on the rear side of the body with discharge ports for the rear cylinders, to which two exhaust pipes 452 are connected. In the rear of the engine 438, the exhaust pipes 450 and 452 are coupled to the associated primary combination pipes 454 and 456, which are in turn coupled to a single secondary combination exhust pipe 458. The pipe 458 is then coupled to an exhaust pipe 462 provided at the rera end with a muffler 460.

A pair of carburetors are disposed in a space between the front and rear cylinder portions 442 and 444 of the vertically arranged V-shaped engine 438. The pair of carburetors 464 and 466 are for feeding an air/fuel mixture into the respective combustion chambers of the front cylinder portion 442 and into the respective combustion chambers of the rear cylinder portion 444. The surfaces of the carburetors 464 and 466, located on both sides of the body, are provided with the heads of adjusting screws for regulating the slow-jetting amount of fuel supplied from a float changer (not illustrated), when the engine 438 operates at a low speed. The head of the adjusting screw 470 of the carburetors 466 of the rear cylinder portion 444 is located on the inside of both main frames 418.

At the positions corresponding to the heads of the adjusting screws 470 on the sides of both main frames 418, a tool-passing passage 472 is formed. The passage 472 extends in the axial direction of the adjusting screw 470, as illustrated in FIG. 22.

As shown in FIG. 22, the tool-insertion passage 472 may be provided with a guide sleeve 474 inserted into the frame sides 426 forming the main frames 418. In this case, the leading end of the sleeve inserted through the passage 472 is guided along the inner face of the guide sleeve 474, and automatically reaches the head of the adjusting screw.

As explained in the foregoing, the tool-insertion passage 472 is formed at the given positions of the sides of the main frames 418 surrounding the sides of the carburetors 466. Consequently, the regulation of a slow-jetting fuel supply, which occurs relatively more frequently among the carburetor regulations, can easily be attained where the carburetors remain attached. The regulation is done by means of suitable tools such as screwdrivers with no need of using any special tool.

FIG. 23 to 28 inclusive show a fifth embodiment of the present invention.

Figure 23:
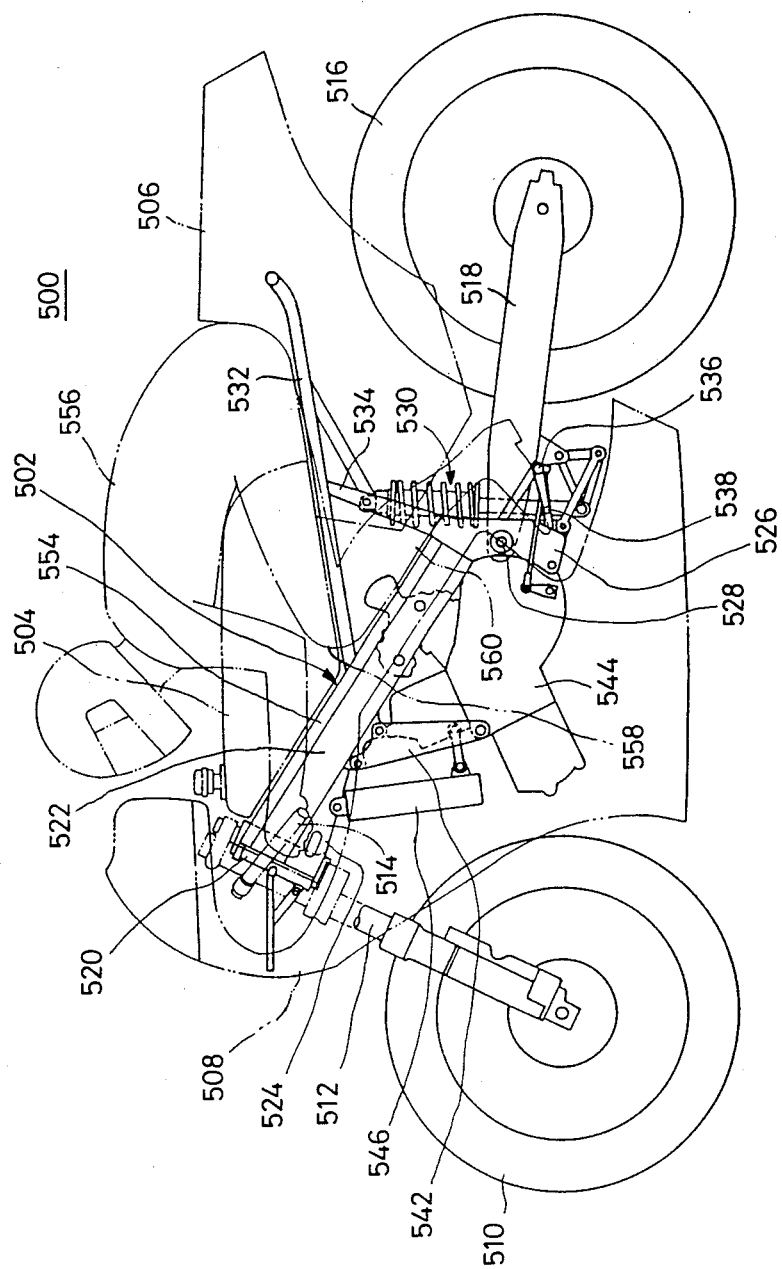

FIG. 23 shows a side of a motorcycle generally shown at 500, including a body frame 502, a fuel tanl 504, a seat 506, a cowling 508, a front wheel rotatably supported on the lower portion of a front fork 512, a handlebar 514 fixed to the upper portion of the front fork 512, and a rear wheel 516 rotatably supported on a rear fork 518.

Figure 24:
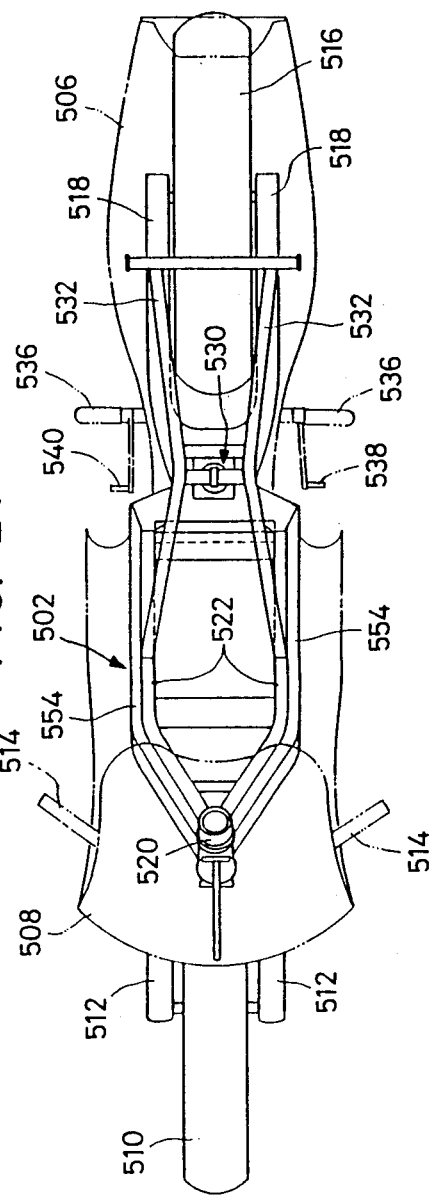

As shown in FIGS. 23 and 24, the body frame 502 includes a pair of main frames 522 and 522 welded and otherwise fixed at the front ends toa head pipe 520. The frames extend linearly downwardly at a given increasing interval toward the rear portion of the body.

A reinforcing head pipe gusset 524 is fixed by welding to the head pipe 520 and the pair of main frames 522 and 522. The rear ends of the pair of main frames 522 are provided with a pair of pivot plates 526. Axis 528 is suspended between the pivot plates. The rear fork 518, on which the rear wheel 516 is supported, is suspended on the pivot axis 528 for vertically swinging movement. The rear fork 518 is buffered by a rear suspension 530. The upper faces of both main frames 522 are fixedly provided at the substantial centers thereof with the front ends of seat rails 532. The seat rails 532 extend upwardly to an elevation higher than the rear portion of the body. The central portions of the seat rails 532 are substantially supported on the upper portions of the pivot plates 526 by means of seat gusset plates 534.

Substantially horizontal steps 536 and 536 extend outwardly from the pair of pivot plates 526. Reference numeral 538 denotes a shift pedal, and 540 stands for a brake pedal.

A pair of downwardly directing engine hangers 542 extend from the front portions of both main frames 522. An engine 544 is supported by means of a pair of engine hangers 542 and the pair of pivot plates 526. Reference numeral 546 denotes a radiator.

Figure 25:
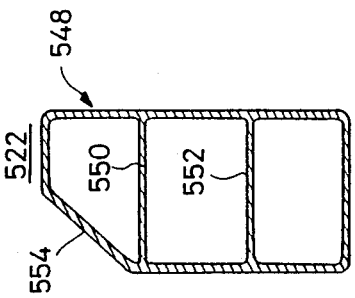
FIGS. 23 to 28 show a fifth embodiment of the present invention.

As illustrated in FIG. 25, each main frame 522 is formed of a closed hollow-type of frame member 548.

The frame member is made of an extruded aluminum product and in cross section is of a rectangular shape. Partitions 550 and 552 are integrally inserted into the frame member 548 along the full longitudinal length thereof to divide the interior into three portions. The frame member 548 is partly chamfered at an angle of about 45° into a pentagonal shape having an inclined face 554.

When the thus shaped frame member 548 is used as the main frame 552, the inclined face 554 is located on the outside of the upper portion of the body, as best shown in FIGS. 23 and 24.

Consequently, even when the main frame 522 overhang on both sides of the engine 544, defining the maximum width of the body, a rider 556 can be seated at the given positions of the seat 506 to place his or her legs upon the steps 536 and 536 at a reduced width. Thus, the rider can take the riding positions as shown in FIG. 23, since the inclined faces 554 define planes with respect to the knees and the shins of the rider.

Figure 26:
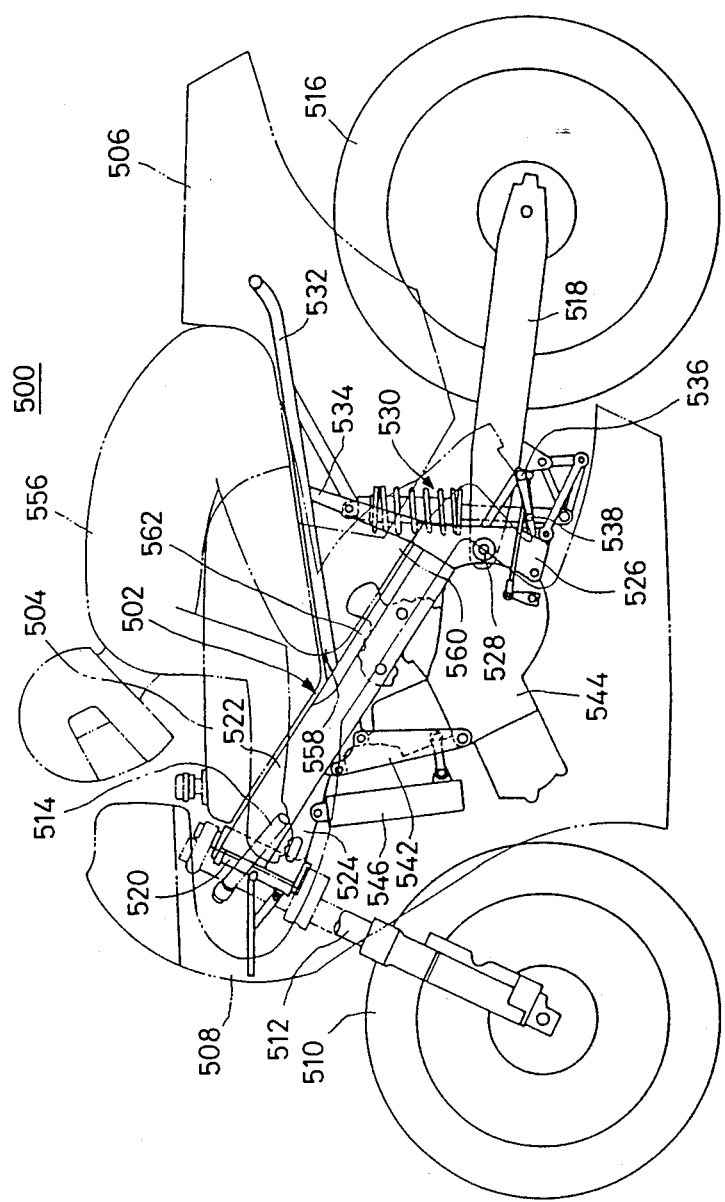
Figure 27:
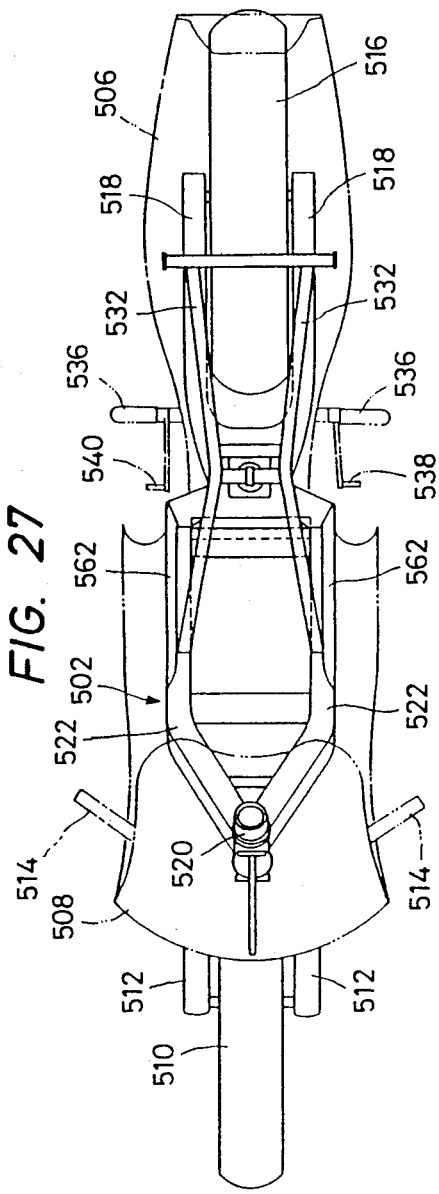
Figure 28:
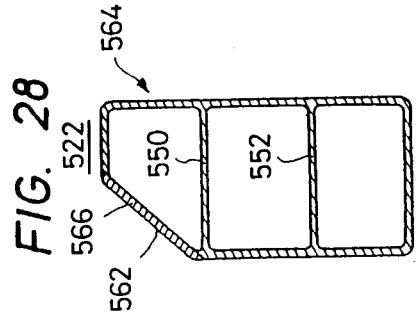

In the embodiment of FIGS. 23 to 25, the frame member 548, used as the main frame 522, is provided with the inclined face 554 along the full length thereof. However, an inclined face 562 may be formed as a portion of the main frame 522, extending substantially from the intermediate portion to the end as illustrated in FIGS. 26 and 27.

In this case, a closed hollow-type member of a cross sectional rectangular shape used as the frame member 564 has a portion removed, scraped off or cut-off from the intermediate portions of the frame to the end. The removed section has a plate-like member 566, forming an inclined face 562, welded or otherwise fixed thereto.

Thus, the rider 556 can place his or her legs upon the steps at a more reduced width. This is done by providing planes with respect to the outer and upper portion of the pair of main frames 522, extending from the head pipe 520 of the front portion of the body, at a given increasing interval, toward the rear portion of the body. Each of the frames are of a rectangular shape in cross section.

It is noted that in the 2nd to 5th embodiments, the main frames may be provided on the sides with the grooves 130, as illustrated in FIG. 4 shown in the first embodiment of the present invention.

What is claimed is:

1. A body frame for an automatic two-wheeled vehicle, said body frame comprising:
   a head pipe; and
   a pair of main frames having front ends, said front end of said main frame being fixed to said head pipe for forming a front wheel-steering mechanism, said pair of main frames extending downwardly at a given interval and in a linear manner toward a rear portion of said body frame, said pair of main frames each including at a lower portion a downwardly extending hanger, each of said main frames being a rectangular cross section having a vertical cross sectional length longer than a horizontal cross sectional length, said rectangular cross section forming a top wall, bottom wall and side walls, said main frame including at least one partition, said partition extending within said main frame in a longitudinal direction and being parallel to said bottom wall of said main frame, each of said main frames further including a groove at an outer surface of said side walls at a location corresponding to a junction of said partition and said side walls, said groove being located on said outside surface of said main frame to avoid abnormal deformation during bending to said main frame.

2. A body frame as defined in claim 1 wherein said pair of frames are each formed of an aluminum alloy.

3. A body frame as defined in claim 1, wherein said pair of main frames are each connected in a vicinity of said front end to a tubular member which is open at both ends through which a horizontal rod of a support stand is inserted.

4. A body frame as defined in claim 1, wherein said pair of main frames each pass on either side of an upper side portion of an engine and extend toward the rear portion of said body frame, and includes a tool-insertion passage at a position of each main frame corresponding to a position of an adjusting screw of a carburetor disposed on said engine, said passage extending in an axial direction of said adjusting screw.

5. A body frame as defined in claim 1, wherein reinforcing head pipe gussets are fixedly provided from lower portions of said pair of main frames to said head pipe.

6. A body frame as defined in claim 5, wherein said head pipe gussets are integrally coupled to engine hanger fittings provided on lower portions of said pair of main frames.

7. A body frame as defined in claim 5, wherein at least one of said head pipe gussets in provided with a passage for insertion of cables sich as control cables or wire harness, said passage extending through said body frame.

8. A body frame for an automatic two-wheeled vehicle, said body frame comprising:
   a head pipe; and
   a pair of main frames having front ends, said front end of said main frame being fixed to said head pipe for forming a front wheel-steering mechanism, said pair of main frames extending downwardly at a given interval and in a linear manner toward a rear portion of said body frame, said pair of main frames each including at a lower portion a downwardly extending hanger, each of said main frames being a rectangular cross section having a vertical cross sectional length longer than a horizontal cross sectional length, said rectangular cross section forming a top wall, bottom wall and side walls, wherein a portion of said top wall and one of said side walls of said rectangular cross section main frame forms an inclined face such that said main frame is pentagonal shaped at least in part thereof, said main frame including at least one partition, said partition extending within said main frame in a longitudinal direction and being parallel to said bottom wall of said main frame, each of said main frames further including a groove at an outer surface of said side walls at a location corresponding to a junction of said partition and said side walls, said groove being located on said outside surface of said main frame to avoid abnormal deformation during bending of said main frame.

9. A body frame as defined in claim 8 wherein said pair of main frames are each formed of an aluminum alloy.

10. A body frame as defined in claim 8, wherein said pair of main frames are each connected in a vicinity of said front end to a tubular member which is open at both ends through which a horizontal rod of a support stand is inserted.

11. A body frame as defined in claim 8, wherein said pair of main frames each pass on either side of an upper side portions of an engine and extend toward the rear portion of said body frame, and includes a tool-insertion passage at a position of each main frame corresponding to a position of an adjusting screw of a carburetor disposed on said engine, said passage extending in an axial direction of said adjusting screw.

12. A body frame as defined in claim 8, wherein reinforcing head pipe gussets are fixedly provided from lower portions of said pair of main frames to said head pipe.

13. A body frame as defined in claim 12, wherein said pipe gussets are integrally coupled to engine hanger fittings provided on lower portions of said pair of main frames.

14. A body frame as defined in claim 12, wherein at least one of said head pipe gussets is provided with a passage for insertion of cables such as control cables or wire harness, said passage extending through said body frame.

15. A body frame for an automatic two-wheeled vehicle, said body frame comprising:
a head pipe;
a pair of main frames having front ends, said front end of said main frame being fixed to said head pipe for forming a front wheel-steering mechanism, said pair of main frames extending downwardly at a given interval and in a linear manner toward a rear portion of said body frame, said pair of main frames each including at a lower portion a downwardly extending hanger, each of said main frames being a rectangular cross section having a vertical cross sectional length longer than a horizontal cross sectional length, said rectangular cross section forming a top wall, bottom wall and side walls;
a pair of pivot plates being connected to rear ends of said main frame to pivotally support a rear fork, said pivot plates extending longitudinally at the middle of the vehicle;
a pair of seat rail gussets being integrally formed at the top end of said pivot plates, and a pair of seat rails being fixed at the front ends thereof to an intermediate portion of the top wall of said main frame and extending rearwards over a rear wheel, said seat rails having portions slightly curved inward at the middle part thereof and being supportedly connected to said seat rail gussets at said curved portion.

16. A body frame as defined in claim 15, wherein reinforcing head pipe gussets are fixedly provided from lower portions of said pair of main frames to said head pipe.

17. A body frame as defined in claim 15, wherein said pipe gussets are integrally coupled to engine hanger fittings provided on lower portions of said pair of main frames.

18. A body frame for an automatic two-wheeled vehicle, said body frame comprising:
a head pipe;
a pair of main frames having front ends, said front end of said main frame being fixed to said head pipe for forming a front wheel-steering mechanism, said pair of main frames extending downwardly at a given interval and in a linear manner toward a rear portion of said body frame, said pair of main frames each including at a lower portion a downwardly extending hanger, each of said main frames being a rectangular cross section having a vertical cross sectional length longer than a horizontal cross sectional length, said rectangular cross section forming a top wall, bottom wall and side walls;
a pair of pivot plates being connected to rear ends of said main frame to pivotally support a rear fork, said pivot plates extending longitudinally at the middle of the vehicle;
a pair of seat rail gussets being integrally formed at the top end of said pivot plates, and a pair of seat rails being fixed at the front ends thereof to an intermediate portion of the top wall of said main frame and extending rearwards over a rear wheel, said seat rails having portions slightly curved inward at the middle part thereof and being supportedly connected to said seat rail gussets at said curved portion;
a fuel tank being supported on its front portion by said main frame and on its rear portion by said seat rails; and
a rear suspension being provided in the vicinity of said pivot plates and extending longitudinally therebetween, a lower end of the suspension being positioned below said rear fork and held to said pivot plates via a linkage.

* * * * *